J. Miller.
Harvester Dropper.

No 53551.  Patented Mar. 27, 1866

Witnesses.  Inventor.

UNITED STATES PATENT OFFICE.

JACOB MILLER, OF CANTON, OHIO.

IMPROVEMENT IN DROPPERS FOR HARVESTERS.

Specification forming part of Letters Patent No. 53,551, dated March 27, 1866.

*To all whom it may concern:*

Be it known that I, JACOB MILLER, of Canton, in the county of Stark and State of Ohio, have invented certain new and useful Improvements in Droppers for Harvesting-Machines; and I do hereby declare the following to be a full, clear, and exact description of the same, reference being had to the accompanying drawings, making a part of this specification, in which—

Figure 1:
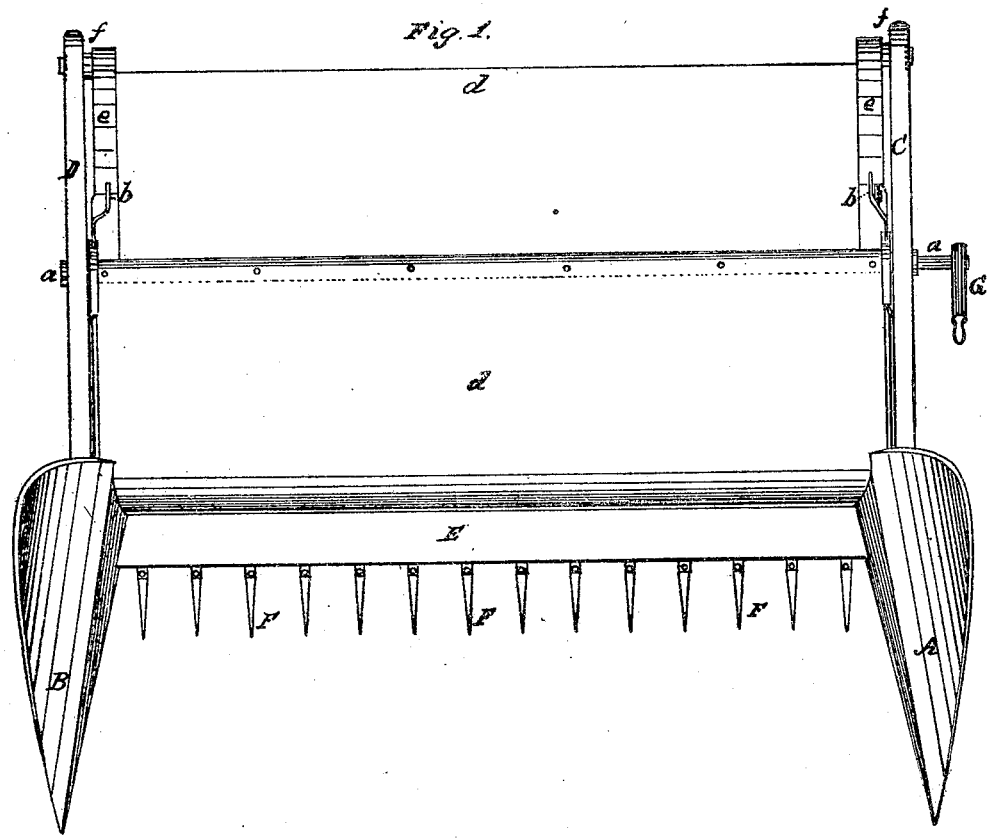
Figure 2:
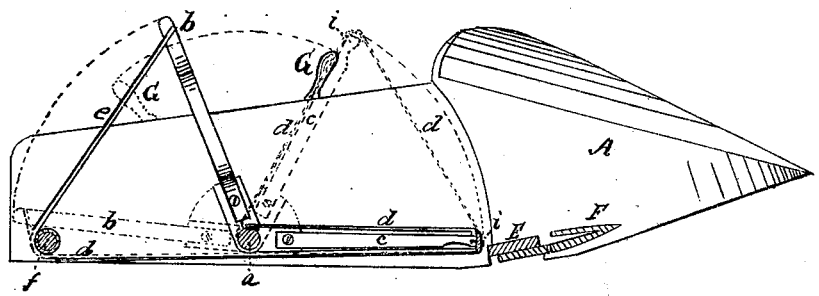
Figure 3:
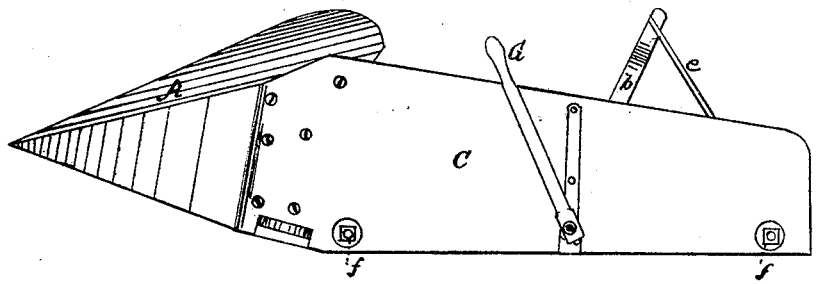

Figure 1 represents a top plan of so much of a harvesting-machine as will illustrate my particular improvements. Fig. 2 represents a section and side elevation of a portion of the same, with the dropper shown by red and black lines in its two operative positions; and Fig. 3 represents a side view of so much of the apparatus as is shown in Fig. 1.

Similar letters of reference where they occur in the separate figures, denote like parts of the apparatus in all the drawings.

The object of this invention is to catch and hold the stalks that are severed by the cutting apparatus until sufficient have accumulated to form a gavel, when, by the operation of a lever, the stalks are deposited on the ground in rear of the cutters in a swath, as it were, and in good shape to be raked into a gavel; and the nature of my invention consists in the use of a flexible apron or dropper that is raised up at an inclination to dump or deliver the gathered stalks backward onto the ground, and that holds the falling stalks separate from those that are being delivered on the ground, and in such position, too, that when the apron is lowered into a horizontal, or nearly so, position the stalks gathered and held by it will fall into proper position to receive the continued accumulations, without tangling, until the next dropping operation takes place.

To enable others skilled in the art to make and use my invention, I will proceed to describe the same with reference to the drawings.

A may represent the inner and B the outer dividers of a harvesting-machine platform or cutting apparatus, and C D the fences or directing-boards, extending rearward respectively from the inside and outside dividers.

E is a finger-bar, and F the fingers or guards in which the sickle works.

A shaft, $a$, passes through from division-board C to division-board D in rear of the finger-bar, and about on the same plane with the finger-bar, said shaft being arranged in suitable bearings in the division or guiding boards, in which it may turn, rock, or roll by means of a lever, G, or its equivalent, operated automatically from any of the driving or moving gear of the machine, or by the hand or foot of the operator riding upon the machine.

Upon the shaft $a$, and close to the guiding-boards and facing each other, are arranged two arms, $b\ c$, which should stand at such angle in relation to each other as will give the desired inclination to the apron $d$ when raised up, to first easily drop over or dump the gathered straws, and, secondly, to catch and hold in an inclined position the falling straws, so that they will, upon the lowering of the apron, fall in good condition to be dumped at the next raising operation.

One edge of the apron $d$ is fastened to the shaft $a$. The other edge, which may have a stiffener in or on it to keep it straight, is attached by straps $e$ at each of its ends or sides, or their equivalents, which straps pass around friction-pulleys $f$ on the guide-boards or fences, and thence to the arms $b$, respectively, where they are secured. The other arms, $c$, are connected by a rod or bar, $i$, underneath the apron, which bar raises up or lets down the apron as the lever G is operated.

The apron may be made of stout canvas or of leather or any other suitably flexible material.

The operation of the dropper is as follows: When the straws are being gathered and held until sufficient is accumulated to form a gavel, the apron $d$ is lying down flat and on about a plane with the sickle, as shown in Fig. 1 and by black lines in Fig. 2. When the accumulated straws are to be dumped or dropped onto the ground the lever G is moved to the position shown in red in Fig. 2. This causes the arms $c$ to raise up, and in doing so to raise up the apron $d$ into the position shown also in red lines in said figure, throwing the straws over backward onto the ground and into the space occupied by the apron while it was down, but which portion of the apron, by the act of raising it in front, is drawn under the raised portion and out of the way of the delivery of the grain, leaving the space it previously occupied free and open. While the apron is in this raised-up position, which is only for a moment, the falling straw rests in an inclined position upon the front of the apron, and as it (the apron) is again let down into a horizontal, or nearly so, position the stalks leaning upward against it are also let down in a straight condition upon the apron, ready for the next dropping operation. While the apron is up the falling straws cannot pass through or under it, as the whole front space is closed by it, and hence there is no tangling of straws.

Having thus fully described the construction and operation of my dropping apparatus, what I claim therein as new is—

A flexible dropper for catching, holding, and delivering grain as it comes from the cutters, constructed and operating in the manner and for the purpose substantially as described.

JACOB MILLER.

Witnesses:
JOHN LAHM,
ISAAC HAZLETT.